United States Patent
Qiang et al.

(10) Patent No.: US 10,962,662 B2
(45) Date of Patent: Mar. 30, 2021

(54) METHOD AND APPARATUS TO CALIBRATE TIMING OF A DETECTOR USING MULTI-CHANNEL EVENTS

(71) Applicant: CANON MEDICAL SYSTEMS CORPORATION, Otawara (JP)

(72) Inventors: Yi Qiang, Vernon Hills, IL (US); Xiaoli Li, Buffalo Grove, IL (US); Kent C. Burr, Buffalo Grove, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/212,326

(22) Filed: Dec. 6, 2018

(65) Prior Publication Data

US 2020/0183025 A1     Jun. 11, 2020

(51) Int. Cl.
*G01T 7/00*     (2006.01)
*G01T 1/29*     (2006.01)

(52) U.S. Cl.
CPC ............ *G01T 7/005* (2013.01); *G01T 1/2985* (2013.01)

(58) Field of Classification Search
CPC combination set(s) only.
See application file for complete search history.

(56) References Cited

U.S. PATENT DOCUMENTS

| | | | |
|---|---|---|---|
| 2007/0270693 A1* | 11/2007 | Fiedler | G01T 1/208 600/436 |
| 2010/0078569 A1 | 4/2010 | Jarron et al. | |
| 2011/0147594 A1* | 6/2011 | Scoullar | A61B 6/037 250/362 |
| 2011/0210255 A1* | 9/2011 | Kim | G01T 1/2985 250/362 |
| 2011/0309252 A1 | 12/2011 | Moriyasu et al. | |
| 2012/0228484 A1 | 9/2012 | Burr | |
| 2014/0336936 A1 | 11/2014 | Inanc | |

OTHER PUBLICATIONS

Qingguo Xie, et al. "Implementation of LYSO/PSPMT Block Detector DAQ System", IEEE Transactions on Nuclear Science, vol. 60, No. 3, Jun. 2013, pp. 1487-1494.

* cited by examiner

*Primary Examiner* — Hugh Maupin
(74) *Attorney, Agent, or Firm* — Oblon, McClelland, Maier & Neustadt, L.L.P.

(57) ABSTRACT

A method and apparatus are provided for positron emission imaging to calibrate timing of a pixelated gamma detector using multi-channel events. The apparatus can include processing circuitry configured to obtain calibration data representing a time and a position at which gamma rays are detected at a plurality of detector elements, and determine which gamma-ray detections of the calibration data correspond to multi-channel detections in which energy of a respective gamma ray is shared and detected by two or more of the plurality of detector elements. Additionally, the processing circuitry can be configured to determine a timing calibration of the plurality of detector elements by optimizing an objective representing agreement between time data of the multi-channel detections in the calibration data and the timing calibration.

20 Claims, 11 Drawing Sheets

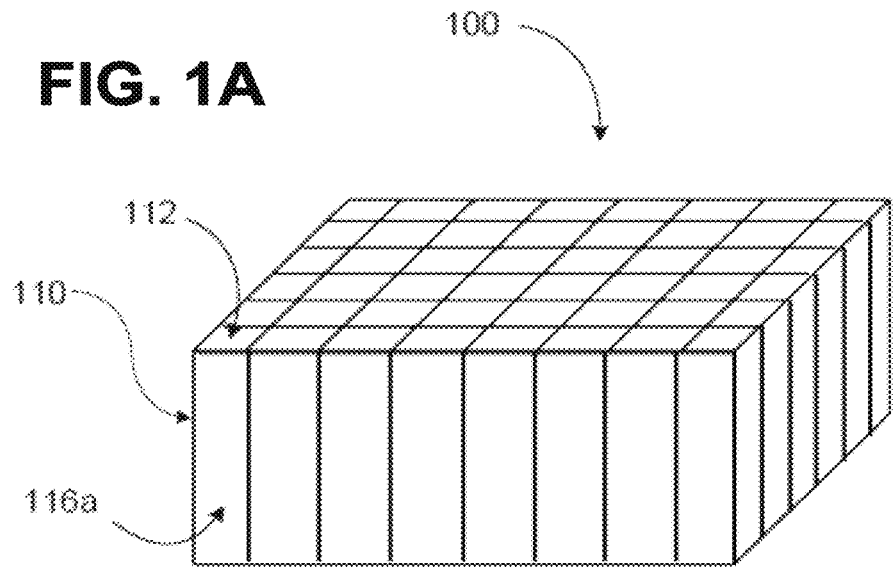
FIG. 1A
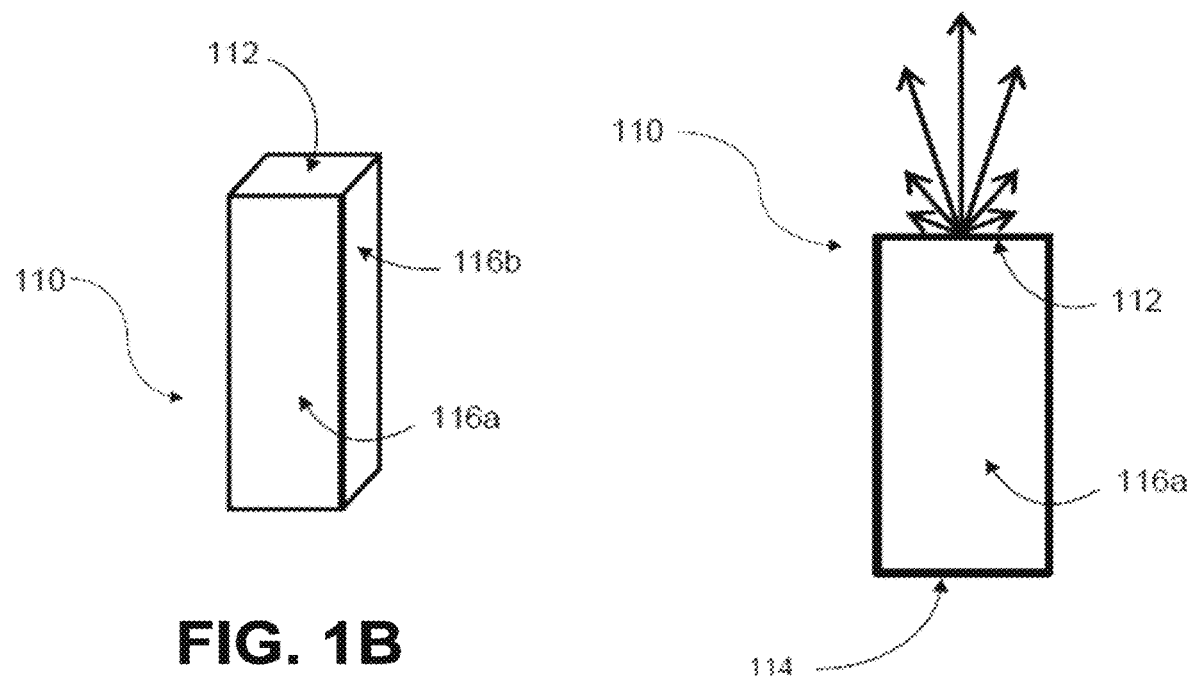
FIG. 1B
FIG. 1C

METHOD AND APPARATUS TO CALIBRATE TIMING OF A DETECTOR USING MULTI-CHANNEL EVENTS

FIELD

This disclosure relates to time detection in gamma ray detectors, and, more particularly, to improved time detection based on gamma ray scatter in gamma ray detectors, for example.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In positron emission tomography (PET) imaging, a tracer agent is introduced into a patient, and the physical and bio-molecular properties of the agent cause it to concentrate at specific locations in the patient's body. The tracer emits positrons, resulting in an annihilation event that occurs when the positron collides with an electron. This annihilation event produces two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to maximize the capture of the isotropic radiation. A PET scanner can be composed of several thousand individual crystals (e.g., Lutetium Yttrium Orthosilicate (LYSO) or other scintillating crystal) which are arranged in two-dimensional scintillator arrays that are packaged in modules with photodetectors to measure the light pulses from respective scintillation events. For example, the light from respective elements of a scintillator crystal array can be shared among multiple photomultiplier tubes (PMTs) or can be detected by silicon photomultipliers (SiPMs) having a one-to-one correspondence with the elements of a scintillator crystal array.

When PMTs are used as the photodetectors, Anger logic can be used, based on the relative geometry between the scintillating crystal elements and the respective PMTs, to determine the relative pulse energy measured by the photodetectors. Using Anger logic/arithmetic and a floodmap calibrated lookup table, the relative pulse energies of the PMTS are compared to determine at which position within the crystal array (i.e., which crystal element) the scintillation event occurred.

To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. The timing information can also be used to determine a statistical distribution along the LOR for the annihilation even based on a time-of-flight (TOF) between the two gamma rays. By accumulating a large number of those lines, the original distribution can be estimated using a tomographic reconstruction process.

TOF-PET detectors can be used in reconstructing images with greater contrast than that of traditional PET detectors. Specifically, TOF-PET detectors use timing information to produce the contrasted images. In order to achieve the best timing performance of TOF-PET detectors, the constant time offset of individual detector channels can be calibrated. These individual detectors include channels that can be calibrated due to differences in signal path length, channel jitter, and the like. However, if discriminators are used for timing measurement, additional energy/amplitude dependent time-walk correction can be further calibrated to yield better results when reconstructing images.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, a positron emission imaging apparatus includes processing circuitry configured to obtain calibration data representing a time and a position at which gamma rays are detected at a plurality of detector elements, and determine which gamma-ray detections of the calibration data correspond to multi-channel detections in which energy of a respective gamma ray is shared and detected by two or more of the plurality of detector elements. Additionally, the processing circuitry can be configured to determine a timing calibration of the plurality of detector elements by optimizing an objective representing agreement between time data of the multi-channel detections in the calibration data and the timing calibration.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is an example detector module, according to certain aspects of the present disclosure;

FIG. 1B is an example prospective view of an array element of the detector module, according to certain aspects of the present disclosure;

FIG. 1C is an example side view of the array element of the detector module, according to certain aspects of the present disclosure;

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments can be practiced without these specific details. In some instances, well-known structures and components can be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions can be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that can be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Figure 2A:
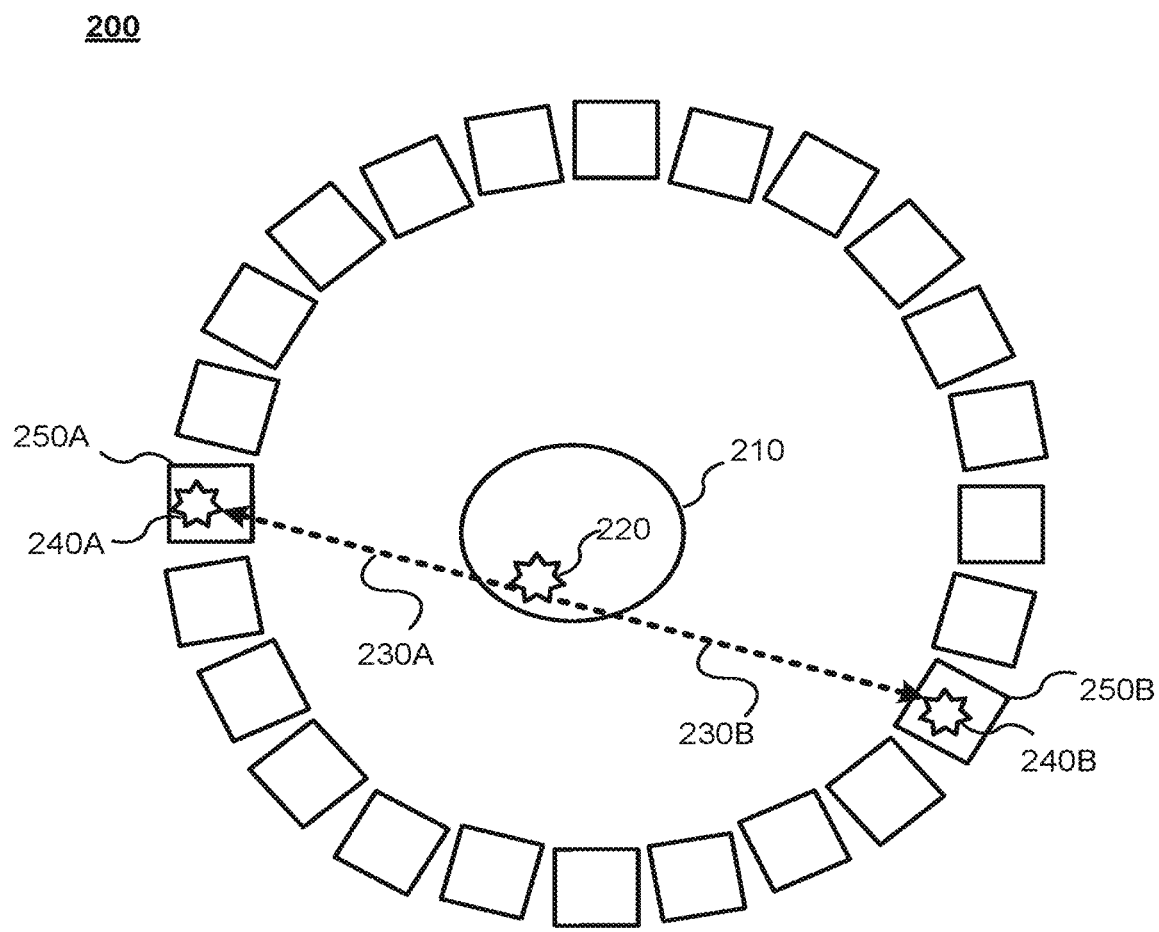
FIG. 2A is an example PET system performing coincidence detection of a positron annihilation event, according to certain aspects of the present disclosure.
Figure 2B:
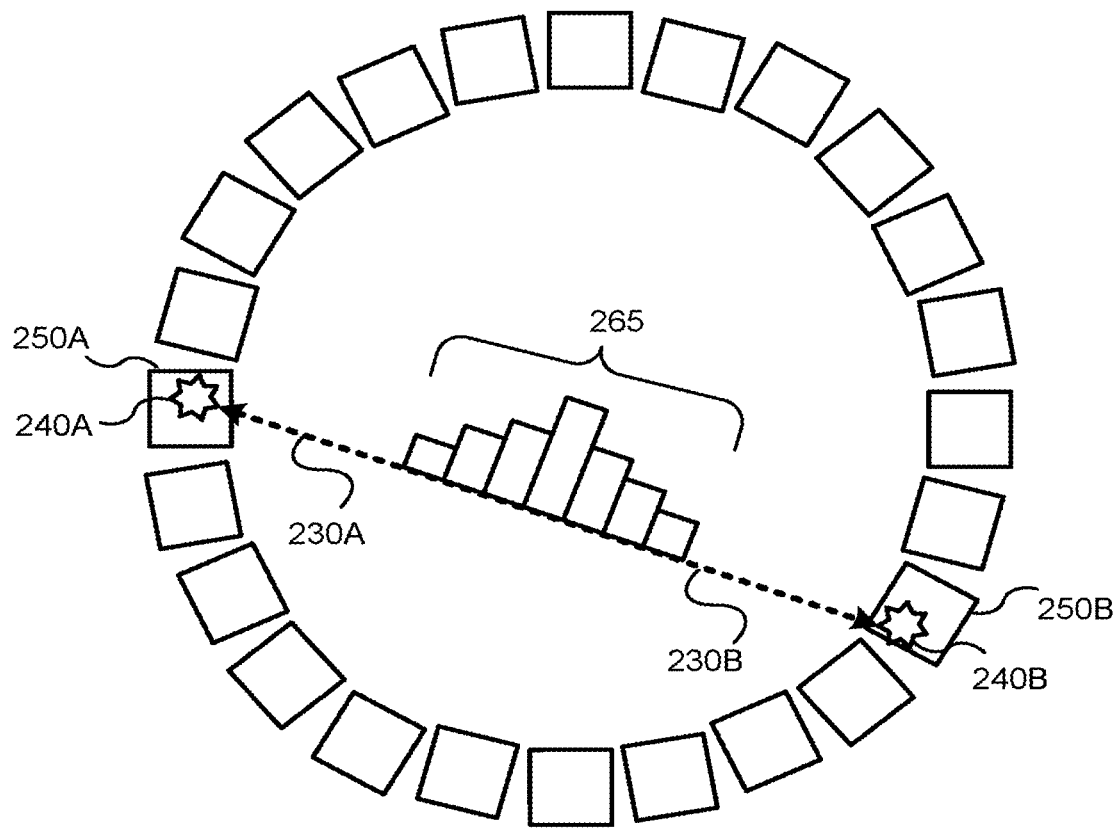
FIG. 2B is an example time of flight (TOF) PET system, according to certain aspects of the present disclosure.

As discussed above, the accuracy of image reconstruction using positron emission tomography (PET) depends on the resolution and accuracy with which coincidence counts can be detected. For example, different detector elements in an array can be subject to different amounts of delay due to differences among their respective signal paths (e.g., response times and propagation delays can vary among amplifiers and the length of the signal transmission lines might not be uniform). To correct for these differences, a calibration can be performed to determine the relative timing delays among the detector elements. This timing calibration can then be applied to newly acquired emission data during positron emission imaging to improve the accuracy of the timing information and time-of-flight (TOF) determinations. TOF determinations enable the point of a positron emission event along a line of response (LOR) to be determined (as illustrated in FIG. 2B), but, for this determination to be accurate, the timing information when the timing information is corrected using the timing calibration to account for relative delays between channels and time walk, which is discussed in more detail below.

Figure 2C:
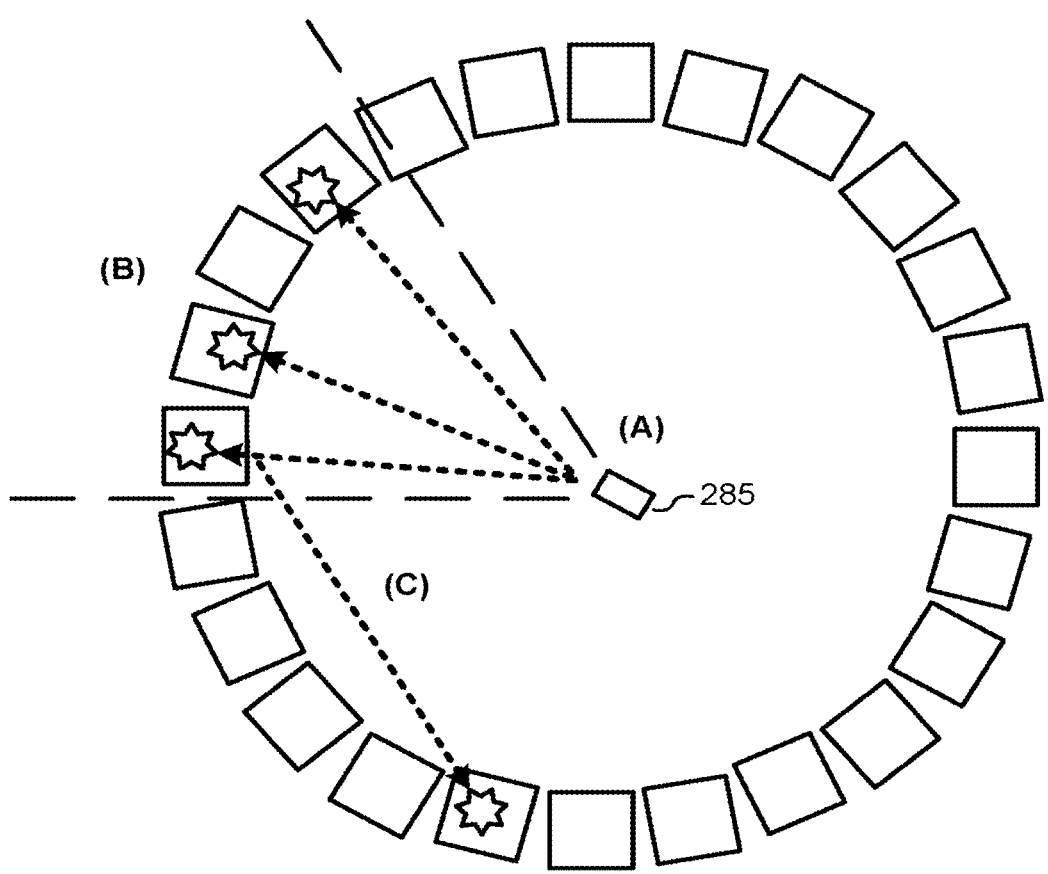
FIG. 2C is an example timing calibration using a source of unpaired gamma rays, according to certain aspects of the present disclosure.

In contrast to the methods described herein, other timing calibrations are typically performed using a positron emission source that simultaneously emits two gamma rays in opposite directions (as illustrated in FIG. 2C). By using a small positron emission source, the location of the emission event along the LOR is known, and from this known location the correct relative time between the detection events is also known. For example, when the positron emission source is placed exactly half-way between two detector elements, the two detector elements detect the paired gamma rays at the exact same time. However, sometimes the recorded times can be different due to relative delays between the signal paths from the scintillator crystal to the digital acquisition system (DAS) providing a time stamp. A relative delay between the detectors can be calibrated by comparing the recorded time difference between the two detections to the actual/known time difference, which is derived from knowing the speed of light and the locations of the detectors and the positron emission source (e.g., $\Delta t = t_1 - t_2 = (L_1 - L_2)/c$, which is described below). This calibration can be improved by preforming a statistical analysis on repeated measurements to minimize statistical uncertainties.

Unfortunately, using a positron emission source can result in the timing-calibration process being slow and labor intensive. This is because the positron emission source must be moved to many different locations within a PET scanner and the calibration measurement repeated. These repeated measurements are necessitated by the fact that the positron emission source is small, resulting in a given detector element being calibrated relative to only the detector element(s) for which the LOR passes through the positron emission source. Thus, to calibrate the given detector element relative to other detector elements the positron emission source is incrementally moved to be positioned on respective LORs between the given detector element and each of the other detector elements. This process is repeated many times because each given detector element is to be calibrated relative a large number of other detector elements, resulting in a slow and labor intensive process.

In contrast, the methods described herein use unpaired gamma rays together with gamma ray scattering (e.g., Compton scattering) to calibrate, advantageously allowing the gamma ray source to be larger and the calibration process to be performed faster.

Figure 5:
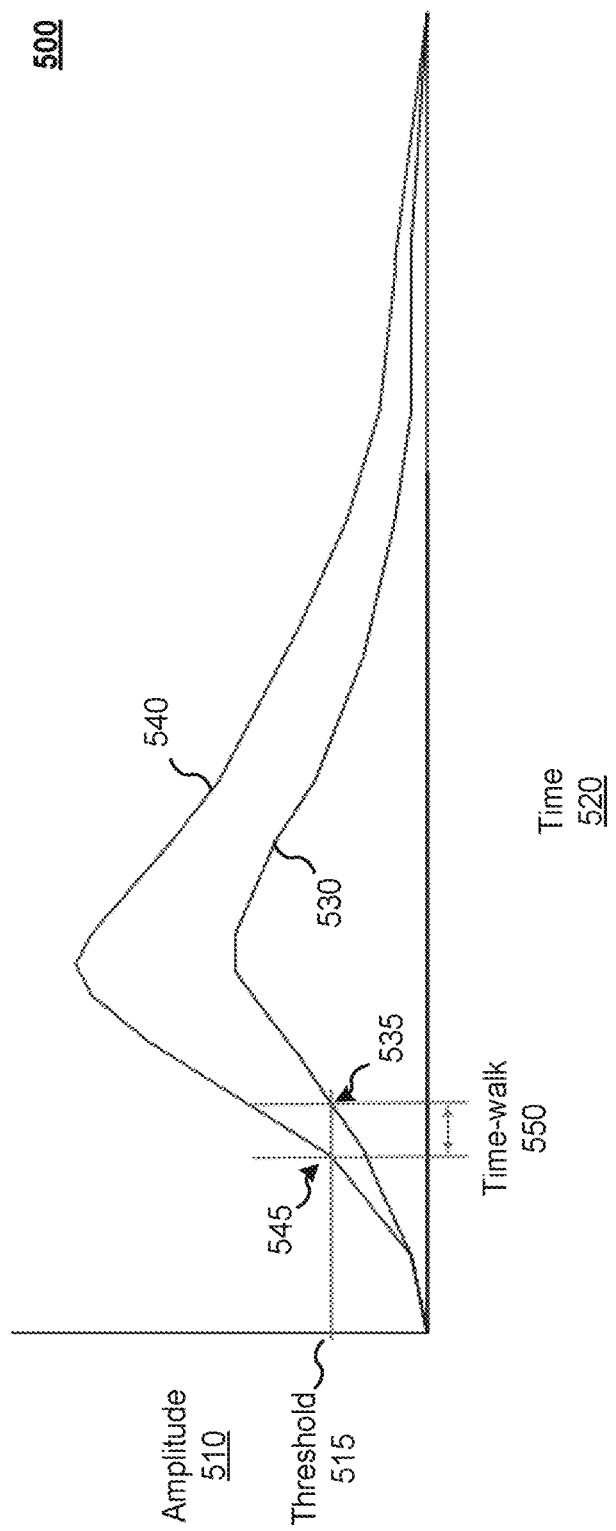
FIG. 5 is an example time-walk plot, according to certain aspects of the present disclosure.

In certain implementations of the methods described herein, a time walk also affects the timing information. The time walk is a shift in the recorded time due to a dependence of the recorded time on the energy/magnitude of a signal pulse. For example, a larger signal pulse can be recorded as occurring earlier on the rising edge of a pulse than a smaller signal pulse, as shown in FIG. 5 and described below. When all of the signal pulses are the same energy/magnitude, then time walk does not affect the timing information. However, due to effects such as Compton scattering, some detections have smaller magnitudes, representing only a percentage of the total gamma ray energy. Accordingly, the energy information of the detections can be monitored for those detections when less than the total gamma ray energy is detected. Then, the energy information of those detections can be used to determine how large the time shift due to the time walk is for of those detections, and the timing information corrected accordingly. To determine the time shifts due to the time walk, calibration data can be used to parameterize the time walk as a function of the energy information measured by the detectors.

To better understand the time walk consider that the recorded time for a detection can be given by when the rising edge of a signal pulse exceeds a predefined amplitude threshold. Thus, for larger pulses, this threshold will be exceeded earlier in the pulse than for smaller pulses (assuming the pulse differ in size but not shape). The exact shape of the curve mapping pulse energy/magnitude to time shift due to time walk will depend on the pulse shape and choice of the predefined amplitude threshold. However, this time-walk/energy mapping (e.g., shown in FIG. 6) can be parameterized by optimizing coefficients of a predefined function. For example, the parameterization can be performed by selecting coefficients of a predefined function to minimize an error measure (e.g., the least square error) between a curve defined by the predefined function and measured data of the time walk as a function of the pulse energy/magnitude. Accordingly, the time walk can be corrected via a time-walk calibration, as described herein.

As discussed above, other methods—not those methods described herein—use a small positron-emission source so that the position of the positron emission is known precisely when calibrating the relative time delays among the detector elements. However, the small size of the positron-emission source limits the number of detector channels that can be calibrated with the positron-emission source at a given location. Thus, the positron-emission source must be moved to a large number of locations in order to calibrated each detector element with a large number other detector elements on the opposite side of a PET gantry. That is, in order to calibrate an entire ring of detectors, such as pixelated gamma detectors in a PET system, the positron-emission source must be moved to multiple locations, making the calibration process slow and inefficient.

In contrast, using the methods described herein, the timing of a detector elements, such as are found in a pixelated gamma detector, can be calibrated using a larger gamma ray source of unpaired gamma rays to more rapidly perform timing calibrations. This is possible because a single gamma ray can be detected as a multi-channel detection event (e.g., due to light/charge sharing or Compton scattering), resulting in simultaneous signal pulses at two or more detector elements. Because multi-channel detection of a single gamma ray can be essentially simultaneous, a relative delay between the recorded times between the arrivals of a primary gamma ray and a scattered gamma ray is due to relative differences in delays between their respective signal paths. This assumes that the detector elements detecting the primary and scattered gamma rays are sufficiently close that the propagation time between them can be ignored—an assumption that is relaxed in other implementations discussed below.

Each multi-channel detection results in energy from a single gamma ray being shared among two or more detector channels as a result of inter-crystal scattering, light-sharing, charge-sharing, or the like. Further, although charge and/or light sharing often occur among detector elements that are neighboring/adjacent to each other, Compton scattering can result in multi-channel detection even when the respective detector elements are several detector elements apart or even separated by larger distances. As described further herein, the sharing of gamma ray energy between multiple detector channels can be referred to as multi-channel events.

These multi-channel events can be used to calibrate relative timing delays between channels of a plurality of detector modules in a PET scanner. Further, the energy range that occurs in the multi-channel events (as a result of the gamma ray energy sharing) can result in a time shift due to time walk, which can be calibrated and then corrected using time-walk correction parameters. To distinguish the large source of unpaired gamma rays from positron emission sources that emit pairs of correlated gamma rays, the large source of unpaired gamma rays is referred to herein as a "single gamma ray source," which is sometimes shortened to just "single source," and, herein, the calibration method using a single source can be referred to as a "single-source calibration."

In certain implementations, to ensure high-quality image reconstruction, a single-source calibration can be used to simultaneously calibrate both a time-walk (i.e., shifts in the measured arrival time of a gamma ray pulse that depend on the amplitude/energy of the measured pulse, when the arrival time is based on the rising edge of the pulse exceeding a predefined threshold) and the relative time delays among detector modules/elements. The time information of each detector module can be calibrated with respect to all other detector channels, by performing the timing calibration using the multi-channel events of the detector modules in a PET system.

Referring now to the drawings wherein like reference numerals designate identical or corresponding parts throughout the several views, FIG. 1A shows a non-limiting example of a detector module 100. The detector module 100 includes a two-dimensional array of channels, otherwise referred to as scintillator elements or detector elements. Each channel absorbs gamma rays and emits part of the absorbed radiation energy as light (i.e., scintillation photons) that can be detected by a photodetector, e.g., a photomultiplier tube (PMT) or a silicon photomultiplier (SiPM). The scintillator crystal in the detector module 100 can be, e.g., an inorganic or organic material with crystalline or amorphous structure.

FIGS. 1B and 1C show respectively a prospective view and a side view of a channel of a detector element 110. The terms "detector channel" and "detector element" are interchangeable and refer to a single element in the array of elements included in the detector module 100. The detector element 110 can be referred to as a scintillator element or a detector element. As illustrated by the arrows radiating from the top surface 112 shown in FIG. 1C, a fraction of the emitted light is transmitted through the top surface of the detector module 100 and a fraction of the transmitted light is detected by photodetectors located above the top surface of the scintillator module. The photodetectors can be photomultiplier tubes, avalanche photodiodes, etc.

In certain implementations, a PET imaging system includes channels that have the shape of a right rectangular prism, as shown in FIGS. 1B and 1C. The detector element 110 has parallel sides 116a and 116b. The bottom surface 114 of each channel is parallel with the top surface 112, and the bottom surface 114 and the top surface 112 of each channel is parallel to the bottom and top surface for all the channels within the detector module 100. In certain implementations, a reflective layer can be arranged between the sides 116a and 116b of respective detector elements in the detector module 100 to minimize light sharing among the detector elements (e.g., a layer of air can reduce light sharing via total-internal reflection).

Now, the use of calibrated timing information for tomographic reconstruction is discussed. FIG. 2A is a non-limiting example of a PET system 200 performing coincidence detection of a positron annihilation event. That is, FIG. 2A illustrates the application of a calibrated TOF PET system used for imaging. FIG. 2A shows a source 210 (e.g., a patient who has been injected with a tracer), an annihilation event 220 in which an emitted positron annihilates an electron to generate a pair of gamma rays that propagate in opposite direction along respective legs 230A and 230B of the line of response (LOR) until their arrivals 240A and 240B are respectively detected at the corresponding detector elements 250A and 250B. A PET image is then reconstructed using the position, energy, and timing information of the signals measured at the detector elements 250A and 250B, the reconstructed image representing the spatial distribution of radioactivity (e.g., tracer density) of the source 210.

In tomographic reconstruction, the LOR including the ray segments 230A and 230B is drawn between the positions of the detector elements 250A and 250B, corresponding to the trajectories of the gamma rays that were detected at the detector elements 250A and 250B. The LOR includes a first portion 230A and a second portion 230B along which the first and second gamma rays propagated, respectively. The difference between the length $L_1$ of the first portion 230A and the length $L_2$ of the second portion 230B can be used to calculate the actual time difference between the two detection events, i.e., $\Delta t = t_1 - t_2 = (L_1 - L_2)/c$, wherein $t_1$ ($t_2$) is the time of the first (second) arrival 240A (240B) and c is the speed of light. Working in the reverse, TOF measurements can be used to estimate the length $L_1$ and $L_2$ of the first and second portions 230A and 230B, e.g., by acquiring the measured time difference and using timing calibrations to correct for relative differences in the electrical signal propagation of the detector elements 250A and 250B after the arrivals 240A and 240B.

The detector modules 250A and 250B can be configured to, upon detection of the arrivals 240A and 240B, generate emission data including, e.g., arrival times, energy data, and position data. This emission data can then be used for tomographic image reconstruction of the spatial distribution of the activity level within the source 210. The detector elements 250A and 250B can be elements within an array of elements in a detector modular, as illustrated by the non-limiting example in FIG. 1A. A plurality of such detector modules can be arranged to surround the source 210, as illustrated by the non-limiting example in FIG. 2A. In certain implementations, detector modules, such as detector elements 250A and 250B, are arranged in an array of other detector modules to continuously surround the source 210 (e.g., an enclosure of detector modules). In this instance, energy can be shared among channels of a pixelated array of detector modules. In other implementations, the detector modules are not continuous, and, therefore, the leakage of scintillation light between detector modules becomes less likely. However, the energy of a gamma ray can nevertheless be shared between non-continuous detector modules via Compton scattering, even though the scintillation light is unlikely to leak from a first detector module in which it originated to a second detector module, which is not continuous with the first detector module.

FIG. 2B is a non-limiting example time-of-flight (TOF) PET system 260. The TOF PET system 260 illustrates an application of a calibrated TOF PET system used for imaging. The system 260 illustrates the same event as FIG. 2A, and further represents a determination of an estimated position 265 of the annihilation event. The variance of the statistical distribution of the estimated position 265 is limited by the precision with which the measured time difference $\Delta t_{meas}$ can be determined. The system 260 referenced by FIG. 2B is configured to use TOF analysis to determine the position along the LOR of the annihilation (illustrated in FIG. 2A).

The system 260 may include processing circuitry configured to estimate a TOF difference 265 in which the arrivals 240A and 240B of the photons at the detector elements 250A and 250B is localized with a certain probability. As such, the TOF difference 265 includes information regarding the likelihood of the point of annihilation 220 along the LOR's 230A and 230B. For example, the TOF difference can be based on timings of the gamma ray arrivals 240A and 240B at the detectors 250A and 250B. Details of TOF analysis are known in the field, and, therefore further details will not be provided herein.

The processing circuitry of the system 260 can be used to improve localization analysis of the annihilation 220, and to more effectively calibrate the timings of detector modules, such as the relative electrical signal delays between detector elements 250A and 250B.

FIG. 2C is a non-limiting example of a system 280 in which timing calibration is performed using a single source 285 and multi-channel detection. FIG. 2C illustrates a single source 285 resulting in some single-channel and some multi-channel detection events. The multi-channel detections are used for calibration of a TOF PET system. Here, Compton scattering will be used as a non-limiting example of multi-channel detection, but other modes of multi-channel detection can be used without deviating from the spirit of the timing calibration method provided herein, as would be understood by a person of ordinary skill in the art.

The timing calibration is performed using a single source 285 that emits gamma rays towards a wide beam (illustrated as the area between the two dashed lines) that overlaps many detector modules of calibration of the PET system 280. The emitted gamma rays are illustrated as dashed lines radiating from the single source 285 towards the detector modules 250A and 250B, which are arranged in an annular ring of detector modules. The emitted gamma rays arrive at the detector modules where they are absorbed and converted into pulses of scintillation photons. The scintillation photons are in turn converted to photoelectrons by the photodetectors to generate a current/voltage pulse.

FIG. 2C shows an example, of generating timing calibration data using a single source 285, as opposed to a positron emission source. Sometimes, arrival of the gamma ray is complicated by Compton scattering resulting in only part of the energy of the incoming gamma ray being deposited in a first scintillator crystal, with the remaining energy exciting the first scintillator crystal as a scattered gamma ray that is then absorbed in a second scintillator crystal of a second detector element. In FIG. 2C, the irradiation of the detector modules by the primary gamma ray beam is illustrated as event (A), the absorption/detection of the gamma rays from the source 285 is illustrated as event (B), and Compton scattering is illustrated as event (C).

At event (A), the single source 285 emits gamma rays in the direction of a plurality of detector modules. The single source 285 can include a radiation source with gamma rays having a higher energy than the 511 keV energy generated in positron emission. For example, the radiation source 285 can use one or more pieces of cesium isotope 137 (Cs-137) which produce gamma rays with energies of 662 keV. These pieces of Cs-137 can be arranged to create an approximately uniform flux density of gamma rays within the beam. In certain implementations, the beam can be a cone beam or can isotopically radiate into all 4π steradians. The gamma rays with energies of 662 keV produced by the Cs-137 are higher than the 511 keV gamma rays produced by positron-emission radiation sources. Instead of multiple pieces, a substantially uniform distributed source could be used (commonly known as a "flood source"). Other gamma ray sources that can be used include, e.g., Cobalt isotope 60 (producing 1.17 MeV and 1.33 MeV gamma rays).

The radiation source 285 may use multiple low-activity radiation sources with long half-lives and relatively high gamma-ray energies (e.g., Cs-137 which has a half-life of approximately 30 years). Other potential choices for a radioactive isotope to be used in the radiation source 285 include: germanium isotope 68 (Ge-68 with a half-life of 0.74 years and gamma-ray energy of 511 keV), sodium isotope 22 (Na-22 with a half-life of 2.6 years and gamma-ray energies of 511 keV and 1.275 MeV), and cobalt isotope 60 (Co-60 with a half-life of 5.3 years and gamma-ray energies of 1.17 MeV and 1.33 MeV). The higher gamma-ray energies of the radiation source 285 can result in the energy deposited in the various detector elements during Compton scattering covering a large range of energies both below and above the 511 keV energy generated by positron emission, allowing for more complete calibration of the time shift due to time walk, as discussed herein.

At event (B), the emitted gamma rays arrive at several of the detector modules. The arrivals of the emitted gamma rays may result in single-channel detections (the top two detection events in FIG. 2C), or multi-channel detections (the bottom detection event in FIG. 2C). In multi-channel detection, the energy from a single gamma ray to be shared between two or more channels (i.e., two or more detector elements). These two or more detector elements can be within a single detector module or distributed among multiple detector modules. For example, if a first gamma ray arrives at a first detector element, the first gamma ray may generate via Compton scattering a scattered gamma ray that exits the first detector element to be absorbed and detected in a second detector element. Higher order scatter occurs when the scattered gamma ray in turn results in one or more additional scattered gamma rays, which can then be detected in a third or even fourth detector element.

At event (C), a particular gamma ray arrives at a particular detector module and causes a scattered gamma ray to be emitted towards another detector module and is detected, generating a signal pulse almost simultaneously with the single pulse generated at the scattering detector module.

Figure 3A:
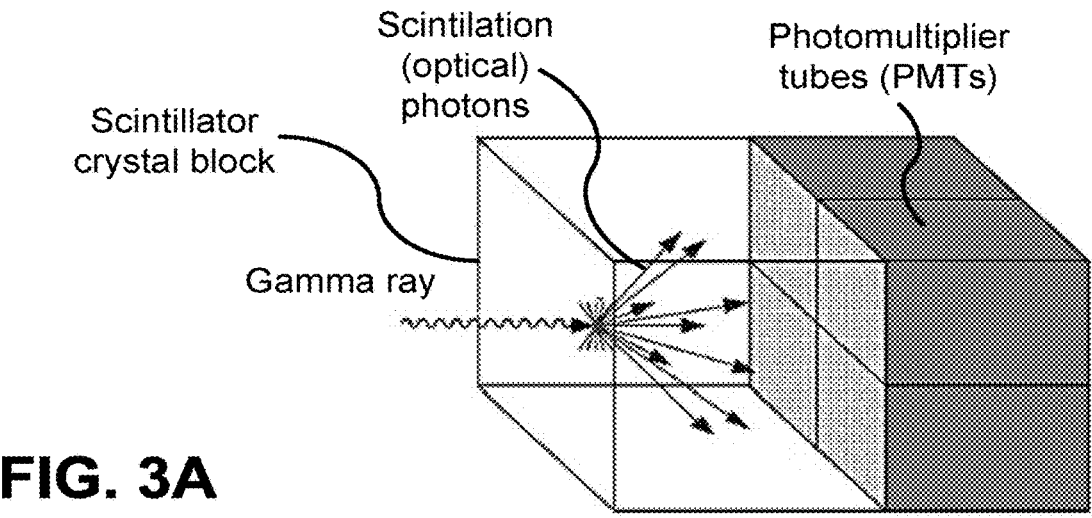
FIG. 3A is an example diagram of a detector module having a single crystal block and photomultiplier tubes (PMTs), according to certain aspects of the present disclosure.
Figure 3B:
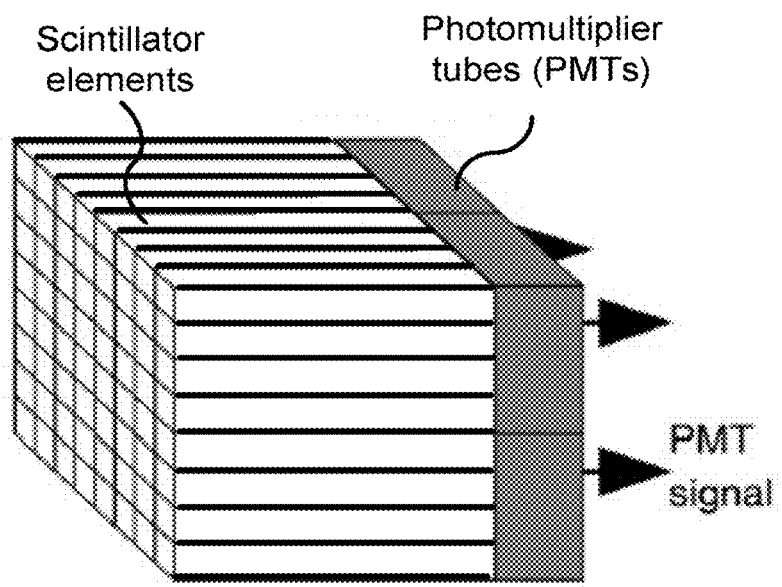
FIG. 3B is an example of a detector module having a block of crystals arranged as an array of scintillator elements and using PMTs as photodetectors, according to certain aspects of the present disclosure.
Figure 3C:
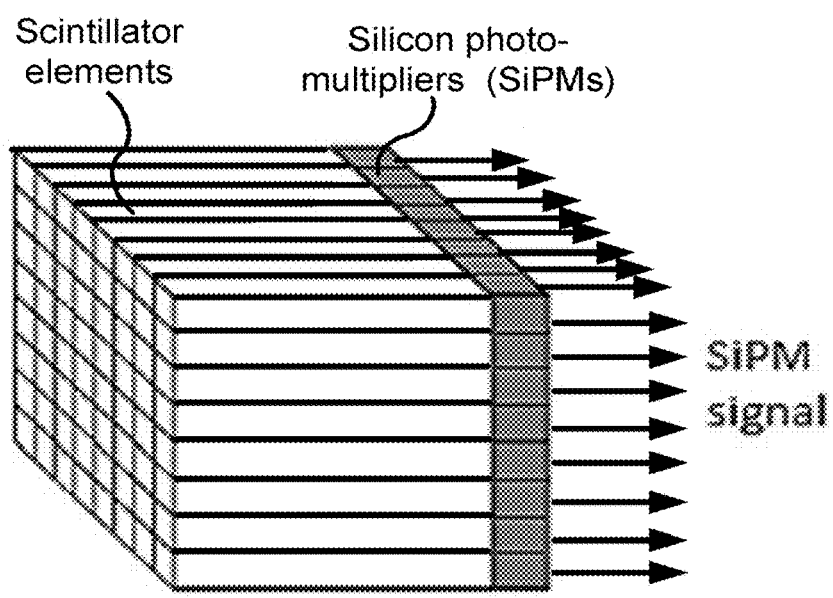
FIG. 3C is an example of a detector module having crystals arranged as an array of scintillator elements and using silicon photomultipliers (SiPMs) as photodetectors, according to certain aspects of the present disclosure.

FIGS. 3A, 3B, and 3C show several non-limiting implementations of a gamma ray detector (also referred to as a gamma camera). In FIG. 3A, the scintillator crystal is a single monolithic block, and the location of the scintillation event converting the gamma ray photon into secondary photons that can be detected by an array of photodetectors, which are illustrated here as photomultiplier tubes (PMTs). The location of the scintillation event can be determined using Anger arithmetic.

In FIG. 3B, the scintillator is cut into a periodic array of separate crystals separated and optically isolated by reflective barriers between the individual elements of the crystal array. This optical isolation between crystals in the block can be imperfect allowing some light sharing between adjacent crystals. When the photodetectors are PMTs, the light sharing between adjacent crystals can be small compared to light sharing that occurs after exiting the crystals, in which case, scintillation events can be distinguished between individual elements of the array using Anger arithmetic to approximately determine locations and then using a floodmap calibration to generate a lookup table mapping the approximate locations calculated using Anger arithmetic to respective indices of the crystal array.

In FIG. 3C, the light from each crystal element is detected by a respective silicon photomultiplier (SiPM). With each crystal having its own photodetector, the light sharing among photodetectors can be reduced. Further, each crystal having its own photodetector can result in enhanced resolution by enabling discrimination between simultaneous scintillation events occurring at different crystals within a single detection module (e.g., discriminating Compton scattering among adjacent crystals).

For many years, PMTs have most commonly been used as the photo detectors for PET. PMTs are vacuum tubes having a photo-cathode material with a work function that allows the conversion of incoming light into photoelectrons that are accelerated through an applied electric field and amplified by interacting with a cascade of dynodes. The resulting electrical current is proportionate to the number of initial scintillation photons and therefore to the energy deposited in the scintillation crystal by the gamma ray.

Segmenting the scintillator blocks and using multiple photodetectors can make it easier the detection locations of the gamma rays (e.g., using many small SiPMs or using Anger arithmetic with PMTs). In FIGS. 3B and 3C small individual scintillation crystals that are a few millimeters in size are tightly packed into blocks/modules, which can be coupled to multiple photodetectors. In Anger arithmetic, the interaction location of the annihilation photon is determined by comparing the relative signals in the photodetectors, which is determined by relative light sharing due the spread-out scintillation photon signals. The calculated location then determines the crystal element to which the photon is assigned based on the floodmap calibrated lookup table.

Figure 4:
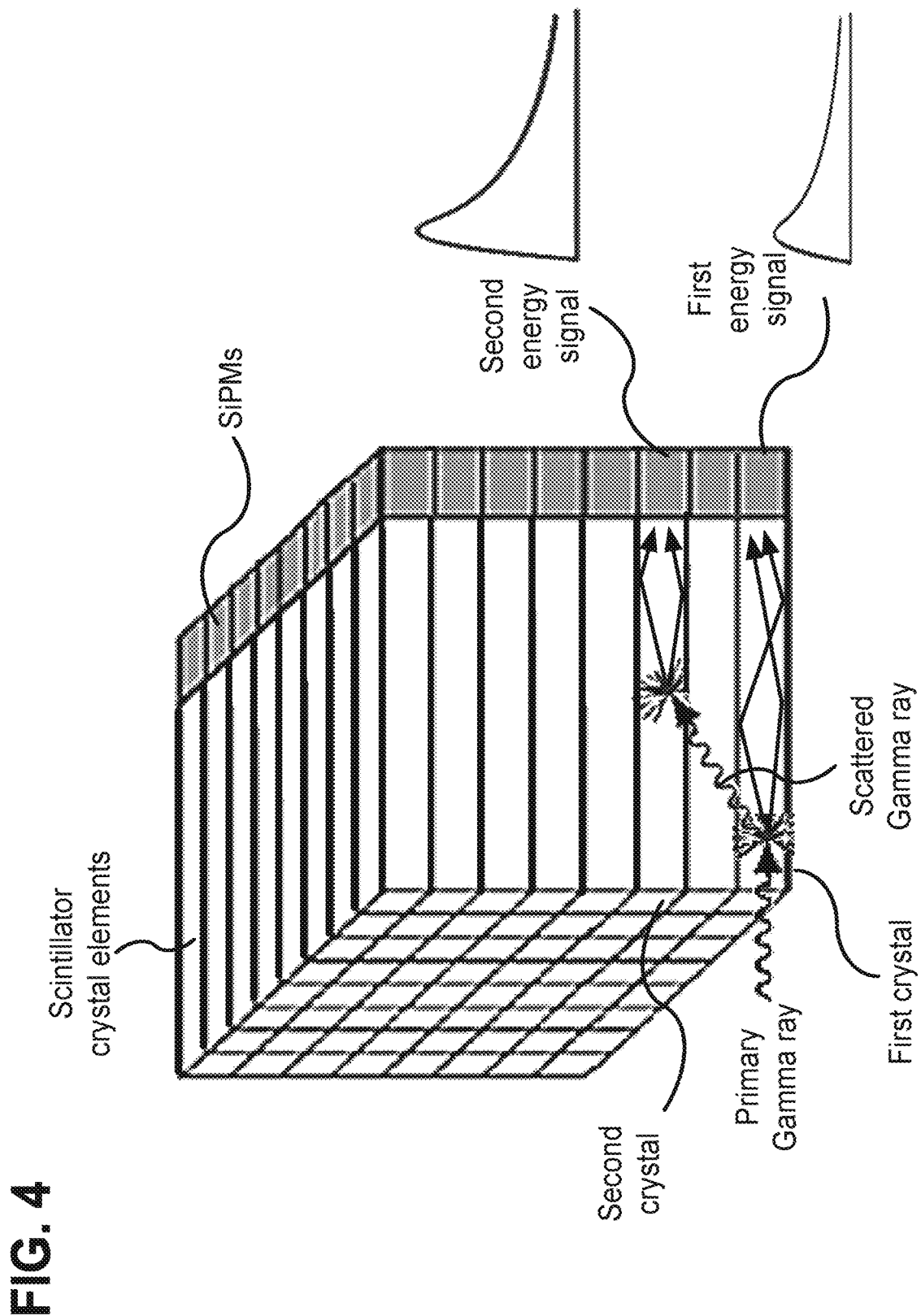
FIG. 4 is an example of Compton scattering resulting in two energy signals from a first crystal and a second crystal respectively, according to certain aspects of the present disclosure.

FIG. 4 shows a non-limiting example of an incident gamma ray undergoing Compton scatter in a first crystal resulting in the remaining energy being deposited in a second crystal. The first and second crystals then respectively produce secondary photons via photoelectric absorption resulting in the corresponding SiPMs generating the first and second energy signals. The scatter angle is small, and the energy in the first energy signal is less than the energy in the second energy signal. Even if the shapes of the first and second pulses are the same and differ on their magnitudes, the two signals can be registered as occurring at different times due to a time-walk that arises when the arrival time is based on when the rising edge of the pulse exceeds a predetermined value, as illustrated in FIG. 5.

FIG. 5 shows a non-limiting example in which two pulses 530 and 540 with different magnitudes but the same shape are registered as arriving at different times as a result of the time shift due to time walk. In FIG. 5, the plot 500 shows a voltage amplitude (vertical axis) plotted as a function of time (horizontal axis) for two simultaneously arriving pulses 530 and 540 with different magnitudes. That is, the plot 500 shows signal amplitude 510 versus time 520. The plot 500 further includes a first signal pulse 530 and a second signal pulse 540. In the plot 500, the first signal pulse 530 has a lower signal peak height than that of the second signal pulse 540.

As a result of the different magnitudes of the first and second signal pulses 530 and 540, the first and second signals 530 and 540 are recorded as occurring at different times, in spite of arriving simultaneously. The difference between the recorded arrival times results from the rising edge of their respective signal amplitudes cross the amplitude threshold 515 at different times. For example, the first signal 530 reaches the amplitude threshold 515 at a first threshold time 535, and the second signal reaches the amplitude threshold 515 at a second threshold time 545. Since the first threshold time 535 is greater than that of the second threshold time 545, the recorded arrival time includes a time shift due to the time walk 550.

Figure 6:
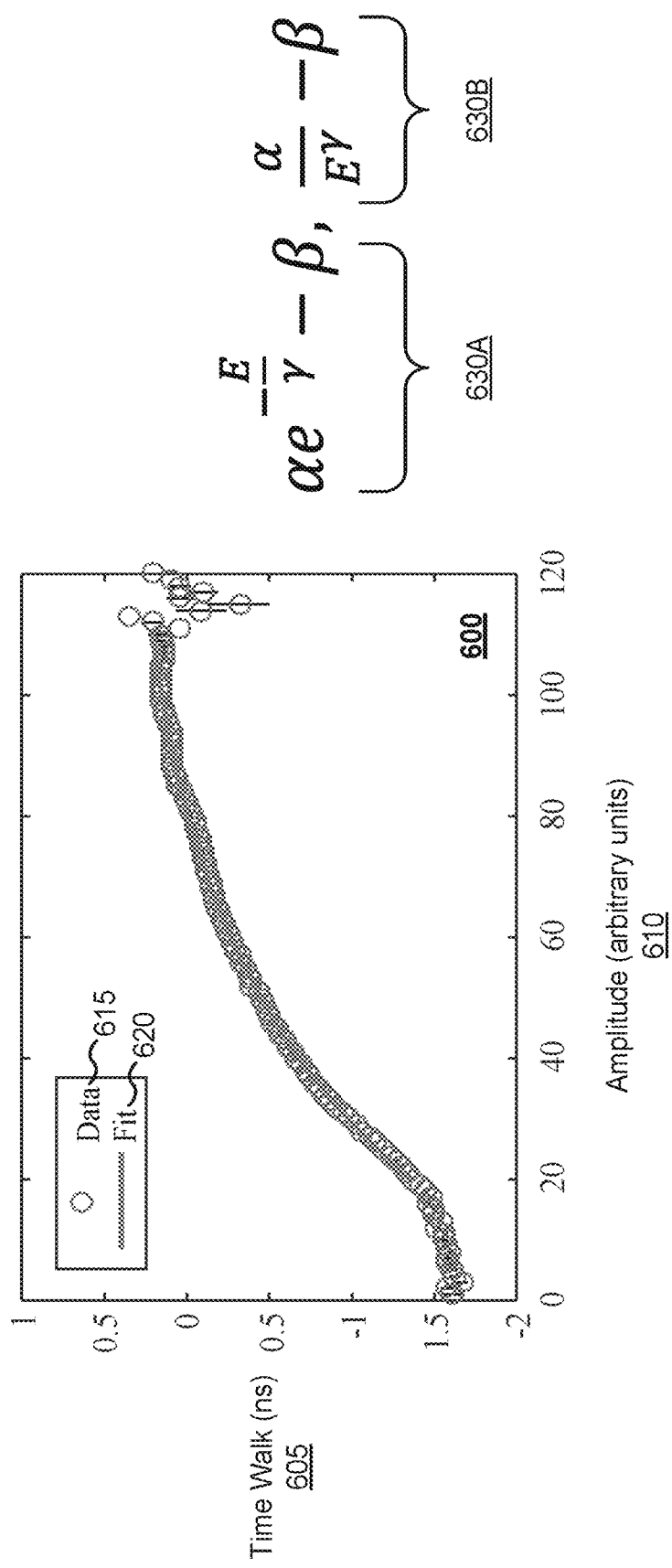
FIG. 6 is an example time-walk parameterization, according to certain aspects of the present disclosure.

FIG. 6 is a non-limiting example of a time-walk parameterization 600 in which the time shift due to the time walk is calculated as a function of the recorded energy of the gamma ray. For example, the gamma-ray energy (e.g., the amplitude 610) for a signal pulse (e.g., the signal pulse 530) can be based on an integrated area under the signal curve, a peak height of the signal pulse, a time over threshold quantity, or any other measured quantity that is monotonically related to the energy of the gamma ray. The time-walk parameterization 600 can be based on curve fitting a predetermined functional form by, e.g., selecting coefficients that minimize an error function (e.g., a root mean square (RMS) error) between the functional form and empirically derived quantities (i.e., measured time shifts and energies of pulses). Alternatively, the time-walk parameterization 600 can be a look-up table of empirically measured values from which time shift due to time walk values can be interpolated/extrapolated.

In FIG. 6, the time-walk parameterization 600 is illustrated as a plot of a best-fit function of time-walk versus amplitude. Specifically, the time-walk parameterization 600 includes empirically measured data points 615 that are parameterized using a fitted curve 620 along a graph of time walk 605 (in nanoseconds) versus amplitude 610.

In certain implementations, the time-walk parameterization 600 has a limit of zero as energy approaches infinity. In certain implementations, the time-walk parameterization 600 is parametrized using a functional form of a constant offset plus a function that approaches zero as the energy approaches infinity, such that when the energy of the gamma ray is 511 keV time-walk parameterization 600 yields an offset of zero. For example, the time-walk parametrization can be realized by curve fitting to the functional form of equation 630A, i.e., $$\alpha e^{-E/\gamma} - \beta,$$

wherein $\alpha, \beta$, and $\gamma$ are coefficients/parameters that are adjusted to optimize the curve fit. In another example, the time-walk parameterization can be realized by curve fitting to the functional form of equation 630B, i.e., $$\alpha/E^\gamma - \beta.$$

Other functional forms can be used for the time-walk parameterization without deviating from the spirit of the methods described herein, as would be understood by a person of ordinary skill in the art.

Figure 7:
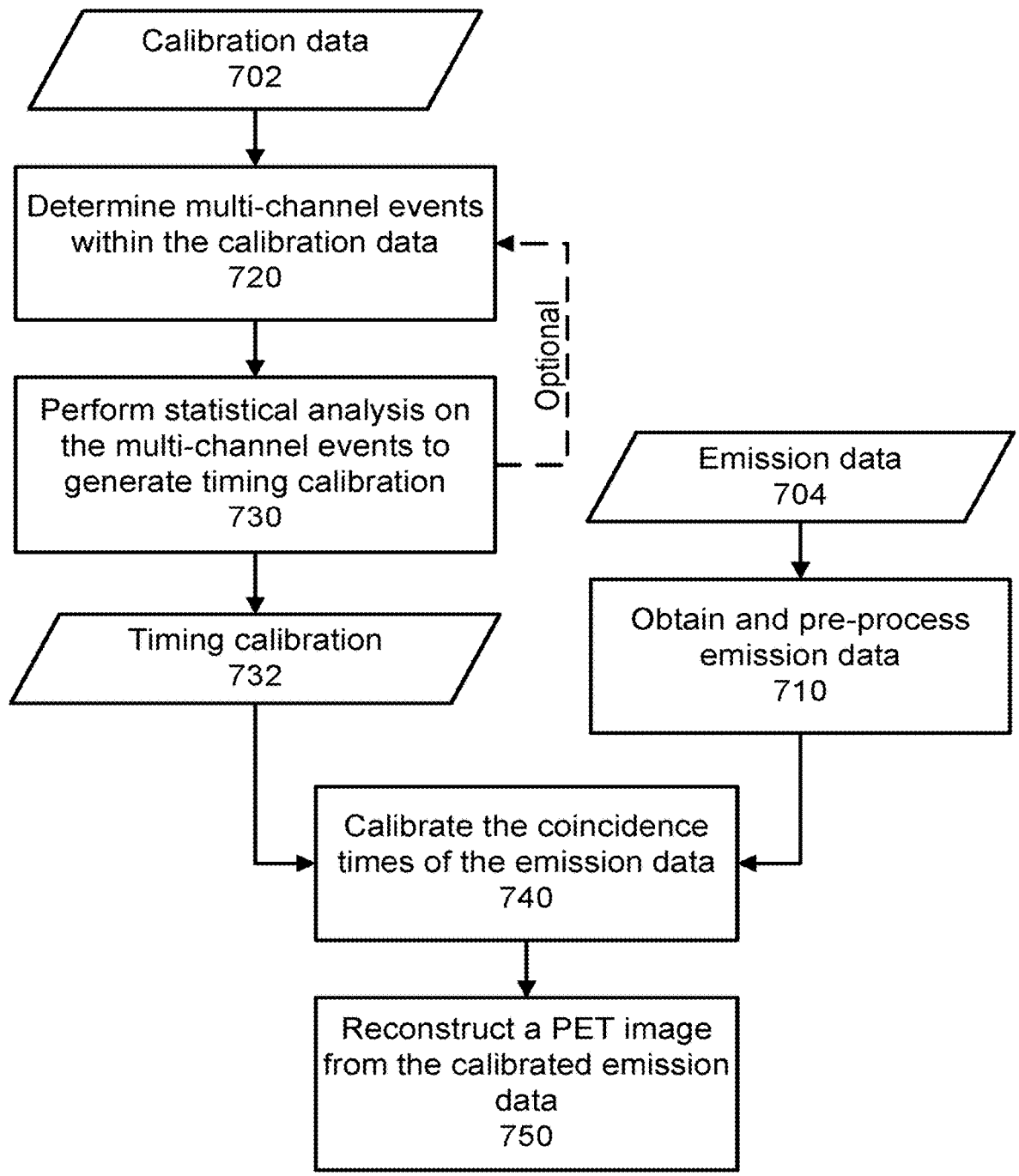
FIG. 7 is a method of calibrating detector timing using multi-channel events and reconstructing a PET image using the calibrated detector, according to certain aspects of the present disclosure.

FIG. 7 shows a flow chart of a non-limiting method 700 for a time calibration of emission data using multi-channel events, and the reconstructing a PET image using the calibrated emission data. The method 700 can be performed by a PET imaging apparatus, such as a PET system, or TOF PET system, including processing circuitry, such as one or more computers.

At step 710, the processing circuitry is configured to obtain and pre-process emission data 704 from a positron-emission source. For example, the processing circuitry is configured to obtain emission data 704 representing (i) arrival times, (ii) energy data, and (iii) position data of detection events corresponding to coincidence pairs from respective positron-emissions occurring in a subject 210. The detection events can be detected at a plurality of detector elements and modules, and each of the detector modules may include two or more channels (i.e., detector elements).

At step 720, the processing circuitry is configured to filter/process calibration data 702 from a single source (e.g., a source of unpaired gamma rays) to determine which of the detected gamma rays correspond to multi-channel events, and then group them according to their respective multi-channel event. The calibration data 702 can include arrival times, energy data, and position data of gamma rays from a single source being detected by the same plurality of detector elements that is used for detecting the emission data 704. Moreover, the generation of the timing calibration can be performed in advance of the PET scan to generate the emission data 704, and the timing calibration can be performed once and stored for later use with many separate PET scans.

For example, the processing circuitry is configured to filter the calibration data 702 based on a time window and an energy window to establish a multi-channel event. For example, when the single source uses Cs-137, signals adding to approximately 662 keV are more likely to correspond to a same multi-channel event. Further, signals occurring closer together in time are more likely to correspond to a same multi-channel event, and signals occurring closer together in space are more likely to correspond to a same multi-channel event. Moreover, when all three of the above conditions are all satisfied, then the signals are even more likely to correspond to a same multi-channel event. Thus, the processing to group signals into multi-channel events can be performed using a multivariate statistical analysis that takes into account the times, energies, and positions of the detections. The term "multi-channel event" refers to when the energy from incoming gamma ray energy is shared among two or more channels of the same or of different detector modules.

The processing circuitry can be additionally configured to determine whether the two or more channels of the particular detector module include more than two channels (e.g., when second-order or higher-orders of Compton scattering occur). In certain implementations, only first-order scatter is used for timing calibrations, and multi-channel events for higher-order scatter are discarded. In other implementations, multi-channel events for both first-order scatter and higher-order scatter are used for the timing calibrations.

For each of the multi-channel events, the processing circuitry can be configured to identify data corresponding to a pair of two hits at the detector elements. Each hit being a detection signal of a detector channel including quantities for a time (t), position (x), and energy (E). As such, if there are two hits, there will be a first and second time (i.e., $t_1$ and $t_2$), a first and second position (i.e., $x_1$ and $x_2$), and a first and second energy (i.e., $E_1$ and $E_2$).

At step 730, the processing circuitry is configured to perform statistical analysis on the multi-channel events to generate a timing calibration 732. This statistical analysis can include simultaneously determining both the time-walk parametrization and the relative signal delay offset among all of the detector elements of a PET system, which together comprise the timing calibration 732. The timing calibration 732 can be determined by performing a statistical analysis on all of the multi-channel events. For example, this statistical analysis can be performed by minimizing an objective function representing agreement between the calibrated time offsets and time walk and the measured time, energy, and position values for the multi-channel events. An iterative search can be performed, such that, as the calibrated time offsets and time walk get closer to their true values, the objective function tends towards zero. Thus, the correct timing calibration can be obtained using convex optimization to minimize the objective function. Then the optimized timing calibration 732 can be stored in a computer readable memory from which it is recalled and used to correct the timing information of coincidence pairs in a PET scan (i.e., the emission data 704).

In certain implementations, the objective function can take the form of chi-square, which is given as $$x^2 = \Sigma \frac{\Delta T(t_1, x_1, E_1, t_2, x_2, E_2)^2}{\sigma(x_1, E_1)^2 + \sigma(x_2, E_2)^2},$$

wherein the term "$\sigma(x,E)$" represents the uncertainty in the position and energy. For example, $\sigma(x,E)$ can be based on the intrinsic resolution of position and energy for a given detector elements. In certain implementations, a typical form of the position and energy dependent intrinsic resolution is $$\sigma(E) = \sigma_0 \left(\frac{E_0}{E}\right)^n.$$

The term $\Delta T(t_1, x_1, E_1, t_2, x_2, E_2)$ is the disagreement between the measured time difference between multi-channel detection events, and "$t_n$", "$x_n$", and "$E_n$" respectively refer to time, position, and energy of the $n^{th}$ detection event of the multi-channel detection events. This timing disagreement $\Delta T$ is non-limiting, and illustrates only the case of two-channel events. However, objective function using higher-order multi-channel events can also be used without departing from the spirit of the methods described herein. As the disagreement between the calibration values for time offset and time walk more closely approximate the measured time differences, the timing disagreement $\Delta T$ will tend towards zero. For example, the disagreement can be expressed as $$\Delta T(t_1, x_1, E_1, t_2, x_2, E_2) = [t_1 - \Delta t_{offset}(x_1) - \Delta t_{walk}(x_1, E_1)] -$$
$$[t_{12} - \Delta t_{offset}(x_2) - \Delta t_{walk}(x_2, E_2)] - \frac{1}{c}\Delta L(x_1, x_2),$$

wherein "$\Delta t_{offset}(x_n)$" refers to the time offset (e.g., the propagation delay of the detector element and signal path),
"$\Delta t_{walk}(x_n, E_n)$" refers to time-walk, "c" refers to the speed of light, and "$\Delta L(x_1 x_2)$" refers to the path length from the first detector element at $x_1$ to the second detector element at $x_2$. The parameterization of the time walk has been discussed above. The term $\Delta L(x_1 x_2)$ can be omitted when the time $\Delta L/c$ is less than the timing accuracy of the detector elements. Further, the term $\Delta L(x_1 x_2)$ can be omitted when the first detector element (e.g., the detector element at which primary gamma ray enters) cannot be disambiguated from the second detector element (e.g., the detector element at which scattered gamma ray is detected). That is, the effective path length $\Delta L(x_1 x_2)$ is the distance between the first and second detectors. If the time for light to travel from the first detector to the second detector is negligible compared to a detector's intrinsic time resolution, then this term can be omitted. If the two detectors are far away, the order of detection (i.e., which detector is first and which is second) must be determined in order for the $\Delta L(x_1 x_2)$ term to provide a proper correction.

For two crystals corresponding to the same multi-channel detection, the order of which crystal is first and which is second can be determined by one of two methods or by both method used in combination.

In the first of the two methods, if the time difference of the two detectors is large enough compared to their time uncertainties, their detection times can be used to determine the order.

In the second of the two methods, if they have difference distances to the source (an asymmetry layout), the order can be determined by the kinematics of Compton Scattering, provided that the energy resolution of the detector elements is sufficient. For example, the percentage of energy in the scatter gamma ray depends on the scattering angle θ is given by the "Compton shift," which is that the difference between the wavelengths of the outgoing and incoming gamma rays, which is $$\lambda' - \lambda = \frac{h}{mc}(1 - \cos \theta),$$

wherein λ is the wavelength primary (i.e., incoming) gamma ray, λ' is the wavelength of the scattered gamma ray, h is the Planck constant, m is the electron rest mass, c is the speed of light, and θ is the scattering angle of the gamma ray. The energy is inversely related to the wavelength by the Planck constant h, i.e., $E=h/\lambda$. If the two detectors are far away, but the order cannot be determined unambiguously, then that particular multi-channel event can be omitted from the calibration data 702.

In certain implementations, the time walk $\Delta t_{walk}$ and relative signal-path delays $\Delta t_{offset}$ (also referred to as "time offset") can be optimized simultaneously using an objective function that accounts for both time walk and relative path delays together. In other implementations, the time walk and relative signal-path delays can be optimized separately with one of the time walk and relative signal-path delays being optimized first, and then once the first of these is set, the other of these is optimized. Further, in certain implementations, the time walk can depend on energy but be independent of position (e.g., $\Delta t_{walk}(E_n)$). Then because the time offset $\Delta t_{offset}$ is energy independent and the time walk $\Delta t_{walk}$ is energy dependent, these two parts can be decoupled and calibrated separately.

In certain implementations, as the objective function is being iteratively updated and the time calibration is improved, the improved timing calibration can be used better filter calibration data 702 to determine multi-channel events. For example, improved timing calibrations mean that a smaller time window can be used to discriminate an actual multi-channel detection of a single gamma ray from the detection of two separate gamma rays that happen to occur close together in time. That is, FIG. 7 shows a dotted line from step 730 to step 720 showing that it is optional to iteratively feed the improved timing calibration back to the multi-channel event discrimination in step 720 and then use the updated multi-channel events to generate even better timing calibrations.

At step 740, the processing circuitry uses the timing calibration 732 to correct the coincidence time of the emission data 704.

At step 750, the processing circuitry is configured to reconstruct a PET image using the corrected emission data.

Figure 8A:
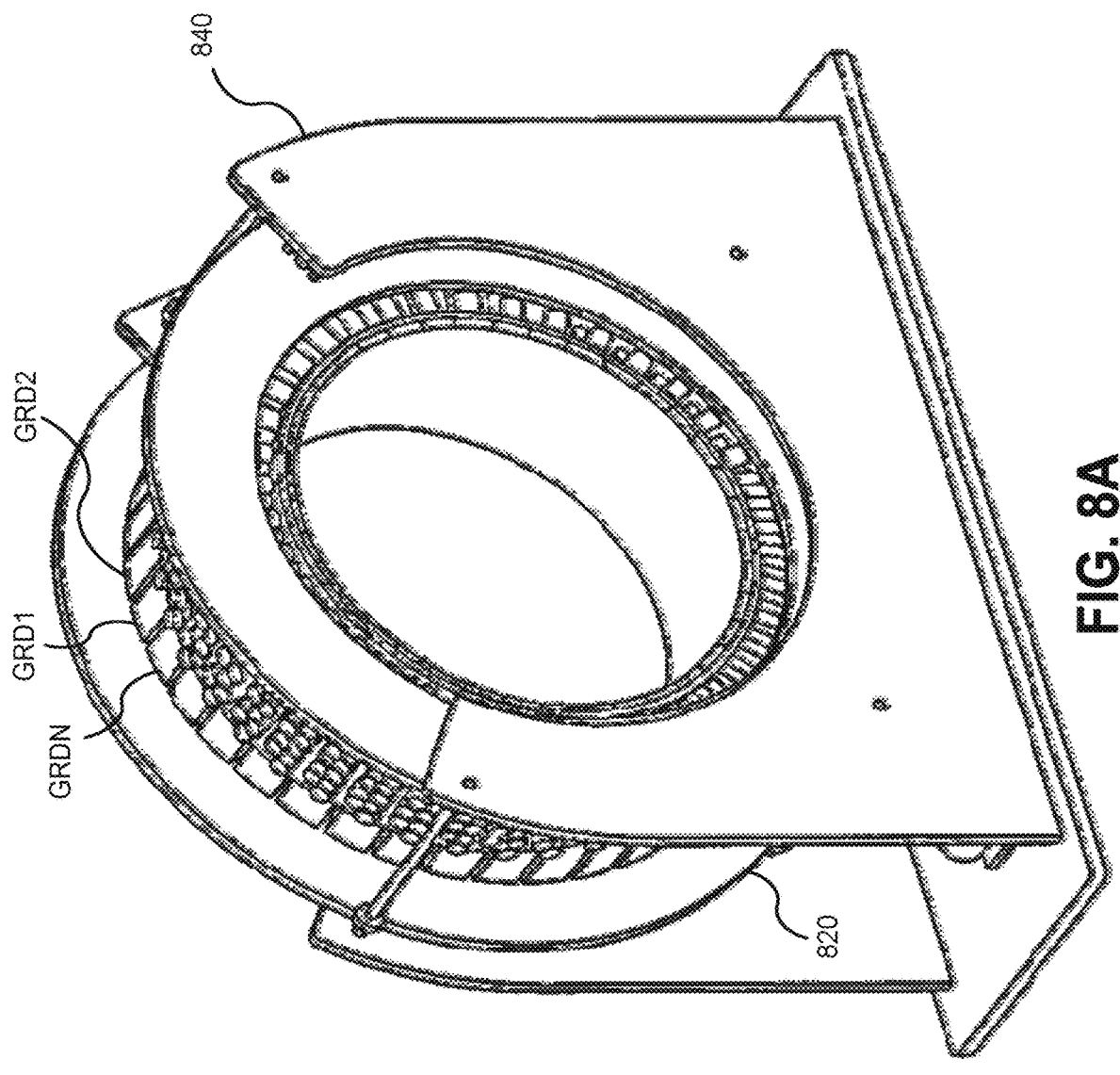
FIG. 8A shows a perspective view of a PET scanner, according to certain aspects of the present disclosure.
Figure 8B:
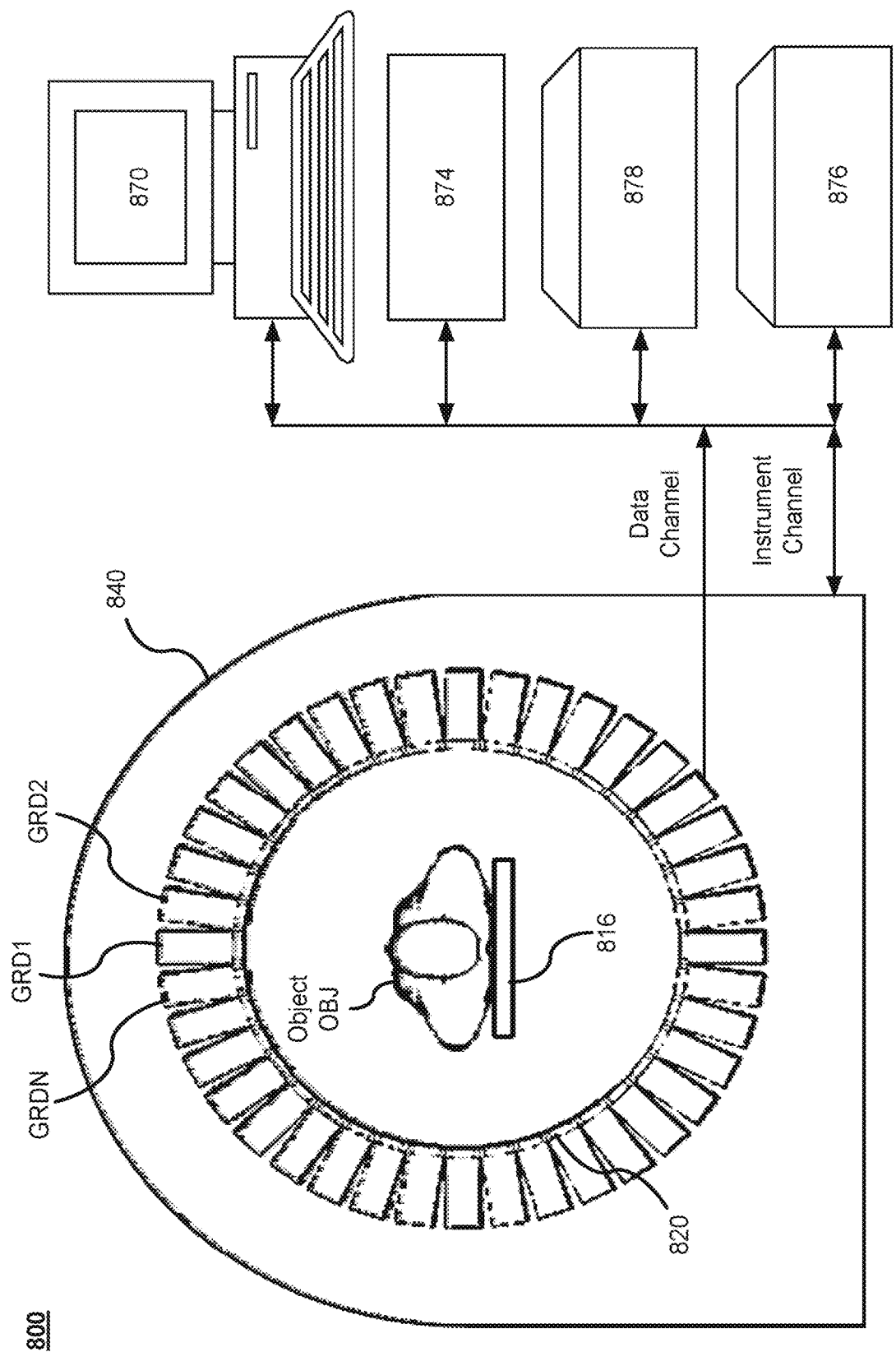
FIG. 8B shows a schematic diagram of the PET scanner, according to certain aspects of the present disclosure.

FIGS. 8A and 8B show a non-limiting example of a PET scanner 800 that can implement the method 700. The PET scanner 800 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 800.

Each GRD can include a two-dimensional array of individual detector crystals, which absorb gamma radiation and emit scintillation photons. The scintillation photons can be detected by a two—dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 8B shows a schematic view of the PET scanner system 800 having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 8A and 8B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 8B shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 8B, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data, pre-reconstruction processing of the detection data, and post-reconstruction processing of the image data, as discussed herein.

The processor 870 can be configured to perform various steps of method 700 described herein and variations thereof. The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation can be coded in VHDL, Verilog, or any other hardware description language and the code can be stored in an electronic memory directly within the FPGA or CPLD, or as a separate electronic memory. Further, the memory can be non-volatile, such as ROM, EPROM, EEPROM or FLASH memory. The memory can also be volatile, such as static or dynamic RAM, and a processor, such as a microcontroller or microprocessor, can be provided to manage the electronic memory as well as the interaction between the FPGA or CPLD and the memory.

Alternatively, the CPU in the processor 870 can execute a computer program including a set of computer-readable instructions that perform various steps of method 700, the program being stored in any of the above-described non-transitory electronic memories and/or a hard disk drive, CD, DVD, FLASH drive or any other known storage media. Further, the computer-readable instructions can be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein can be embodied in a variety of other forms; furthermore, various omissions, substitutions and changes in the form of the methods, apparatuses and systems described herein can be made without departing from the spirit of this disclosure.

The invention claimed is:

1. A positron emission imaging apparatus, comprising:
processing circuitry configured to
obtain calibration data representing respective times, energies, and positions at which gamma rays from a first source are detected at a plurality of detector elements,
determine which gamma-ray detections of the obtained calibration data correspond to multi-channel detections as a result of gamma-ray scattering in which energy of a single gamma ray is detected by two or more of the plurality of detector elements,
determine a timing calibration of the plurality of detector elements by optimizing an objective function representing an agreement between time data of the determined gamma-ray detections corresponding to multi-channel detections as the result of gamma-ray scattering in the calibration data and the timing calibration; and
calibrate, using the determined timing calibration, time information of imaging data obtained from a positron emission source different from the first source, in order to reconstruct a positron emission tomography (PET) image using the calibrated time information of the imaging data.

2. The apparatus of claim 1, wherein the processing circuitry is further configured to
obtain the imaging data, which represents respective other times, other energies, and other positions at which gamma rays from the positron emission source are detected at the plurality of detector elements,
wherein the calibrating the time information of the imaging data includes calibrating time information of coincidence pairs in the imaging data to generate the calibrated time information of the imaging data.

3. The apparatus of claim 1, wherein the processing circuitry is further configured to
group the gamma-ray detections corresponding to the multi-channel detections by selecting, for each of the multi-channel detections, two or more gamma-ray detections that satisfy one or more of (i) occurring close together in space, (ii) occurring close together in time, and (iii) summing to a predefined energy of the gamma rays, and
omit, from the multi-channel detections, respective multi-channel events including more than a predefined number of gamma-ray detections.

4. The apparatus of claim 1, wherein the objective function accounts for relative time offsets among signal paths of the plurality of detector elements.

5. The apparatus of claim 4, wherein the objective function accounts for a time-walk representing a time shift due to differences in the energies of the obtained calibration data.

6. The apparatus of claim 5, wherein the processing circuitry is configured to determine the timing calibration, wherein the time-walk is parameterized by coefficients in a predefined function.

7. The apparatus of claim 6, wherein the processing circuitry is configured to determine the timing calibration, wherein the time-walk is parameterized by coefficients $\alpha, \beta$, and $\gamma$ in one of functions (i) $\alpha e^{-E/\gamma} - \beta$ and (ii) $\alpha/E^\gamma - \beta$, wherein E is a respective energy of the energies of the calibration data.

8. The apparatus of claim 5, wherein the processing circuitry is further configured to determine the timing calibration of the plurality of detector elements by optimizing the objective function, wherein the optimizing the objective function is performed by
iteratively searching for time offsets and a time-walk parametrization that causes the objective function to approach a global minimum, and
stopping the iteratively searching upon satisfying predefined search criteria.

9. The apparatus of claim 1, wherein the processing circuitry is further configured to determine the timing calibration of the plurality of detector elements, wherein the objective function is a chi-squared objective function.

10. The apparatus of claim 1, wherein the processing circuitry is further configured to
determine, for each of the multi-channel detections, an order in which the corresponding gamma-ray detections occurred,
determine, based on the determined order, a propagation time of a gamma ray from an earlier occurring gamma-ray detection to a latter occurring gamma-ray detection of the respective multi-channel detection, and
determine the timing calibration, wherein, when a magnitude of the propagation time exceeds a predefined timing resolution threshold, the objective function accounts for the propagation time of the single gamma ray from the earlier occurring gamma-ray detection to the latter occurring gamma-ray detection of the respective multi-channel detection.

11. The apparatus of claim 1, wherein the processing circuitry is configured to determine which of the gamma-ray detections of the calibration data correspond to the multi-channel detections by filtering the calibration data based on one or more of a time window and an energy window.

12. The apparatus of claim 1, wherein the processing circuitry is configured to repeat the determining which of the gamma-ray detections correspond to the multi-channel detections and the determining of the timing calibration by,
updating a determination of which of the gamma-ray detections of the calibration data correspond to the multi-channel detections after using the timing calibration to correct the respective times of the calibration data, and
updating the timing calibration based on the updated determination of which of the gamma-ray detections correspond to the multi-channel detections.

13. An apparatus, comprising:
a plurality of detector elements, each of the plurality of detector elements being configured to (i) detect gamma rays, and (ii) generate emission data representing a time and a position at which the gamma rays from a positron emission source are detected at the plurality of detector elements; and
processing circuitry configured to
obtain calibration data representing respective times, energies, and positions at which gamma rays from a first source are detected at the plurality of detector elements,
determine which gamma-ray detections of the obtained calibration data correspond to multi-channel detections as a result of gamma-ray scattering in which energy of a single gamma ray is detected by two or more of the plurality of detector elements, determine a timing calibration of the plurality of detector elements by optimizing an objective function representing an agreement between time data of the determined gamma-ray detections corresponding to multi-channel detections as the result of gamma-ray scattering in the calibration data and the timing calibration; and calibrate, using the determined timing calibration, time information of imagine data obtained from a positron emission source different from the first source, in order to reconstruct a positron emission tomography (PET) image using the calibrated time information of the imaging data.

14. A positron emission imaging method, comprising:

obtaining calibration data representing respective times, energies, and positions at which gamma rays from a first source are detected at a plurality of detector elements;

determining which gamma-ray detections of the calibration data correspond to multi-channel detections as a result of gamma-ray scattering in which energy of a single gamma ray is detected by two or more of the plurality of detector elements;

determining a timing calibration of the plurality of detector elements by optimizing an objective function representing an agreement between time data of the determined gamma-ray detections corresponding to multi-channel detections as the result of gamma-ray scattering in the calibration data and the timing calibration; and calibrating, using the determined timing calibration, time information of imaging data obtained from a positron emission source different from the first source, in order to reconstruct a positron emission tomography (PET) image using the calibrated time information of the imaging data.

15. The method of claim 14, further comprising obtaining the imaging data, which represents respective other times, other energies, and other positions at which gamma rays from the positron emission source are detected at the plurality of detector elements;

wherein the calibrating the time information of the imaging data includes calibrating time information of coincidence pairs in the imaging data to generate the calibrated time information of the imaging data.

16. The method of claim 14, further comprising grouping the gamma-ray detections corresponding to the multi-channel detections by selecting, for each of the multi-channel detections, two or more gamma-ray detections that satisfy one or more of (i) occurring close together in space, (ii) occurring close together in time, and (iii) summing to a predefined energy of the gamma rays, and omitting, from the multi-channel detections, respective multi-channel events including more than a predefined number of gamma-ray detections.

17. The method of claim 14, wherein the determining the timing calibration of the plurality of detector elements includes simultaneously determining one or more of a time-walk parametrization and a relative signal delay offset among the plurality of detector elements by optimizing the objective function, which accounts for a time-walk representing a time shift due to differences in the energies of the obtained calibration data, wherein the optimizing the objective function is performed by iteratively searching for time offsets and a time-walk parametrization that causes the objective function to approach a global minimum, and stopping the iteratively searching upon satisfying predefined search criteria.

18. The method of claim 14, further comprising:

determining, for each of the multi-channel detections, an order in which the corresponding gamma-ray detections occurred;

determining, based on the determined order, a propagation time of a gamma ray from an earlier occurring gamma-ray detection to a latter occurring gamma-ray detection of the respective multi-channel detection; and determining the timing calibration, wherein, when a magnitude of the propagation time exceeds a predefined timing resolution threshold, the objective function accounts for the propagation time of the gamma ray from the earlier occurring gamma-ray detection to the latter occurring gamma-ray detection of the respective multi-channel detection.

19. The method of claim 14, wherein the determining which of the gamma-ray detections correspond to the multi-channel detections and the determining of the timing calibration are to repeated by, updating the determination of which of the gamma-ray detections of the calibration data correspond to the multi-channel detections after using the timing calibration to correct the respective times of the calibration data, and updating the timing calibration based on the updated determination of which of the gamma-ray detections correspond to the multi-channel detections.

20. A non-transitory computer-readable storage medium storing computer-readable instructions thereon which, when executed by a computer, cause the computer to perform a method, the method according to claim 14.

* * * * *